United States Patent
Walton et al.

(10) Patent No.: US 9,963,301 B2
(45) Date of Patent: May 8, 2018

(54) DRY GRANULAR MATERIAL FEEDER/CONVEYOR FOR NEAR-VERTICAL LIFTING

(71) Applicants: Otis Raymond Walton, Livermore, CA (US); Hubert J. Vollmer, Tracy, CA (US)

(72) Inventors: Otis Raymond Walton, Livermore, CA (US); Hubert J. Vollmer, Tracy, CA (US)

( * ) Notice: Subject to any disclaimer, the term of this patent is extended or adjusted under 35 U.S.C. 154(b) by 0 days. days.

(21) Appl. No.: 15/802,477

(22) Filed: Nov. 3, 2017

(65) Prior Publication Data

US 2018/0057272 A1    Mar. 1, 2018

Related U.S. Application Data

(63) Continuation-in-part of application No. 15/212,194, filed on Jul. 16, 2016, now Pat. No. 9,809,390.

(51) Int. Cl.
*B65G 33/16* (2006.01)
*B65G 33/24* (2006.01)
(Continued)

(52) U.S. Cl.
CPC ............ *B65G 47/16* (2013.01); *B65G 33/16* (2013.01); *B65G 33/265* (2013.01);
(Continued)

(58) Field of Classification Search
CPC ........ B65G 33/24; B65G 33/16; B65G 33/12; B65G 65/463; E21B 49/02; E21B 10/43; E21B 10/003; E21B 10/54; E21B 7/005; E21B 7/006; E21B 7/06; E21B 3/00; E21B 7/04; E21B 17/20
See application file for complete search history.

(56) References Cited

U.S. PATENT DOCUMENTS

| | | | | |
|---|---|---|---|---|
| 3,949,863 A | * | 4/1976 | Lippi | A01K 5/0258 198/666 |
| 4,026,606 A | * | 5/1977 | Williams | B65G 33/16 406/193 |

(Continued)

FOREIGN PATENT DOCUMENTS

| | | | | |
|---|---|---|---|---|
| DE | 2931402 A | * | 5/1979 | B65G 33/24 |
| EP | 2669464 A1 | * | 12/2013 | E21B 27/04 |

(Continued)

*Primary Examiner* — Mark A Deuble
(74) *Attorney, Agent, or Firm* — Richard Brewster Main; Main Law Cafe

(57) ABSTRACT

An improved feeder/conveyor includes a flexible rotating open helix screw inside a cylindrical sheathing. A motor drive is attached to the flexible rotating open helix screw above at a delivery end, and such provides the rotational speeds necessary to generate the centrifugal and lifting forces necessary. The improvements include a conical bullnose tip as a feeder that attaches to the flexible rotating open helix screw with a curved and tapered support feeder gusset. Such attachment mechanically supports and aligns the conical bullnose tip to the distal end of the flexible rotating open helix screw and a central turning axis. A nose opening in the conical bullnose tip allows either exit or entry of material freely to or from the supply bed, depending on the conveying conditions.

8 Claims, 10 Drawing Sheets

Figure 3A:
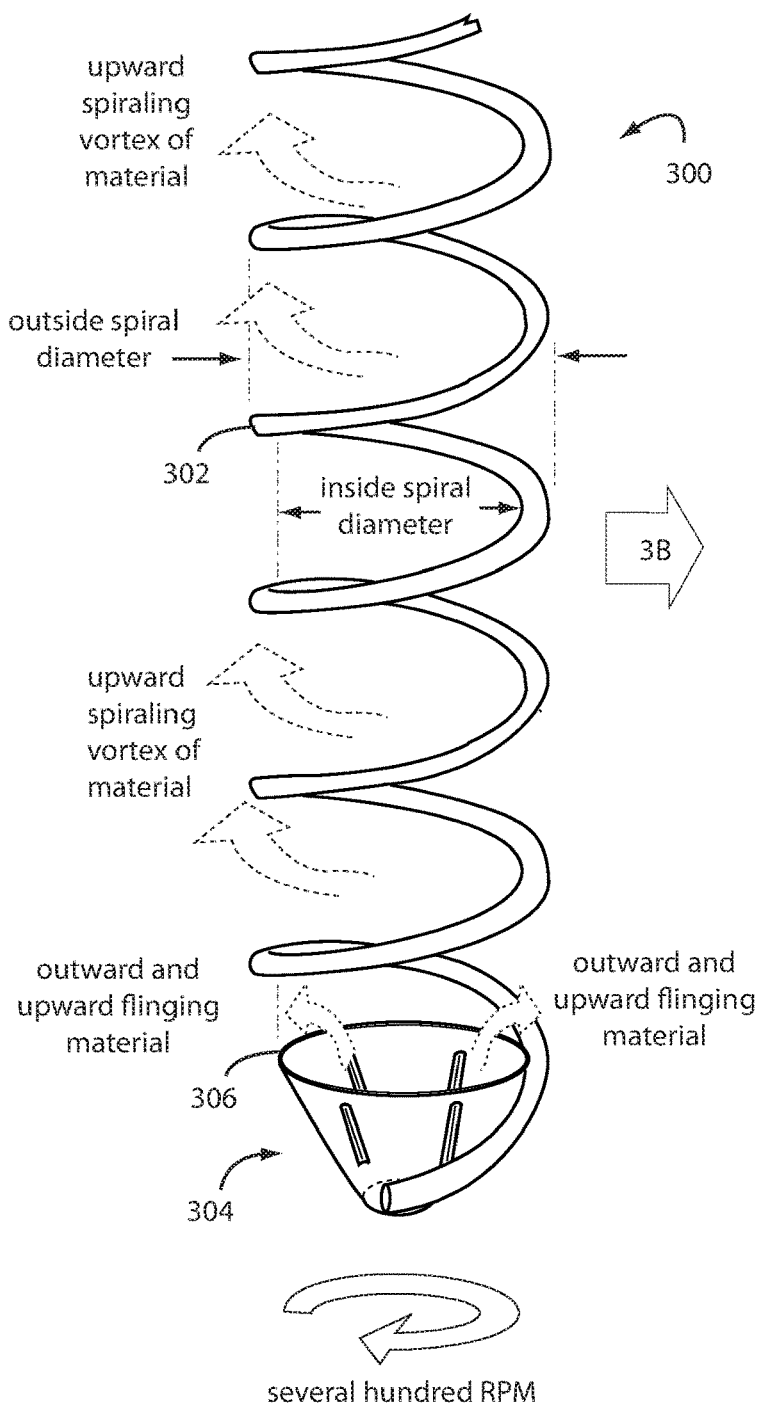

(51) Int. Cl.
*B65G 65/46* (2006.01)
*B65G 47/16* (2006.01)
*B65G 33/26* (2006.01)
*B65G 33/34* (2006.01)

(52) U.S. Cl.
CPC ............ *B65G 65/463* (2013.01); *B65G 33/34* (2013.01); *B65G 2201/042* (2013.01); *B65G 2812/0527* (2013.01)

(56) References Cited

U.S. PATENT DOCUMENTS

| | | | | |
|---|---|---|---|---|
| 4,202,438 | A * | 5/1980 | Rotilio | B65G 33/16 198/524 |
| 4,393,609 | A * | 7/1983 | Persson | B65G 33/12 198/671 |
| 4,742,852 | A * | 5/1988 | White | B65G 65/463 141/256 |
| 4,872,546 | A * | 10/1989 | Hindermann | B65G 33/16 198/659 |
| 5,099,986 | A * | 3/1992 | Kuzub | B65G 33/16 198/659 |
| 9,334,693 | B2 * | 5/2016 | Walton | E21B 49/02 |
| 9,809,390 | B2 * | 11/2017 | Walton | B65G 33/24 |

FOREIGN PATENT DOCUMENTS

| | | | | |
|---|---|---|---|---|
| JP | 58220010 | A * | 12/1983 | ............ B65G 33/16 |
| JP | 59097914 | A * | 6/1984 | ............ B65G 33/16 |

\* cited by examiner

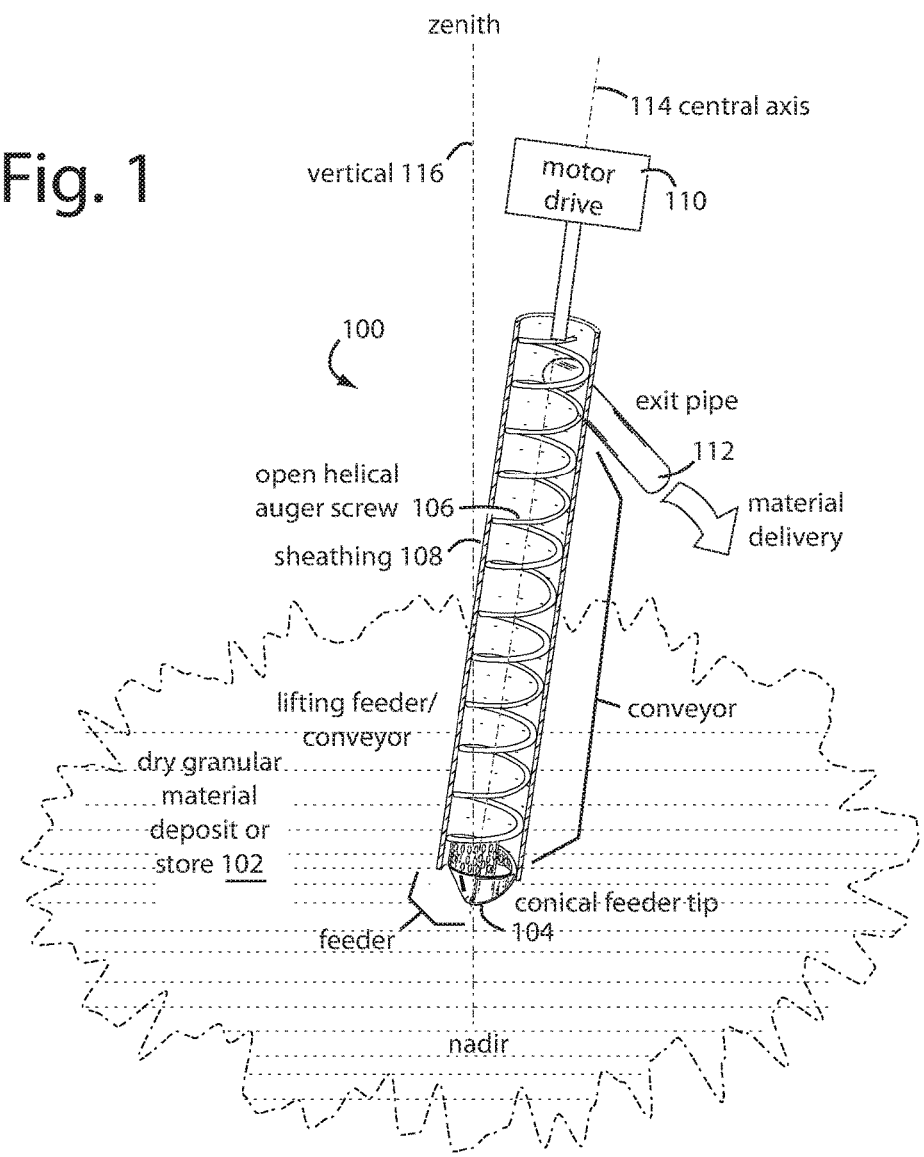

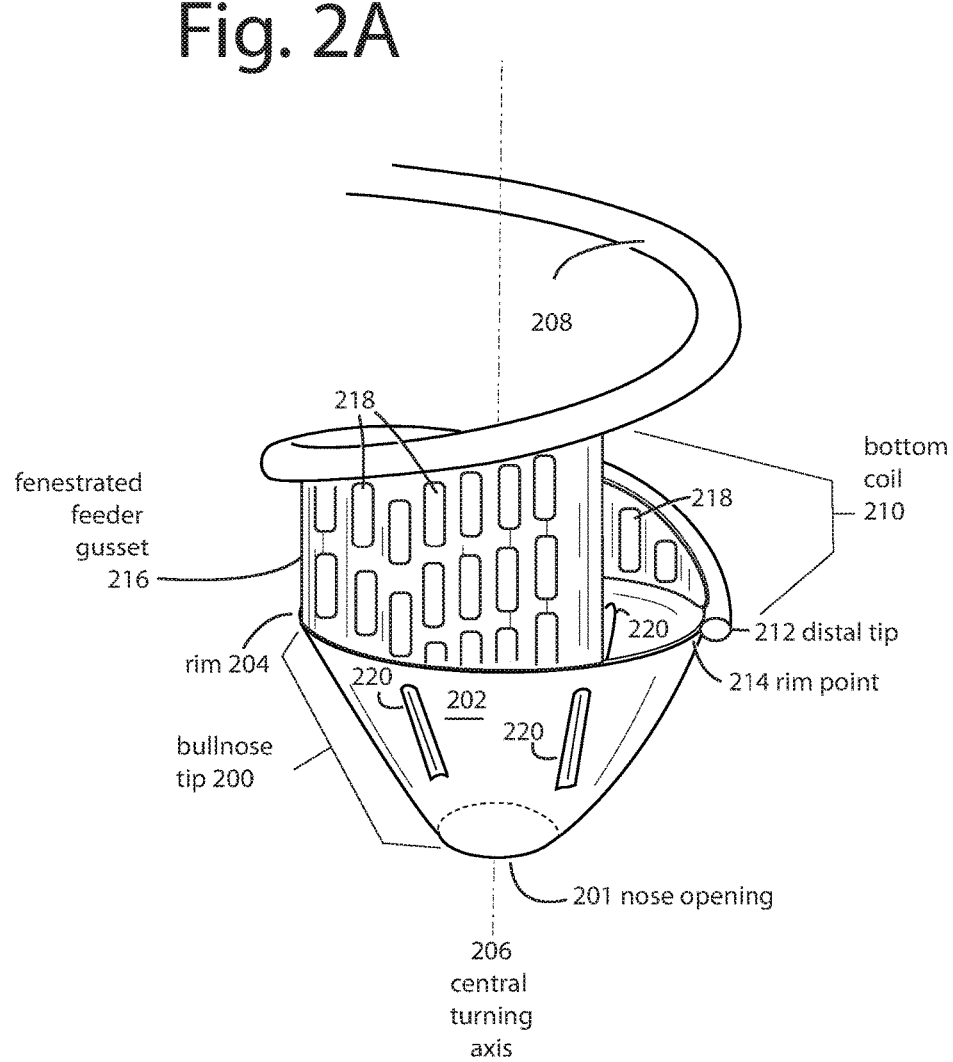

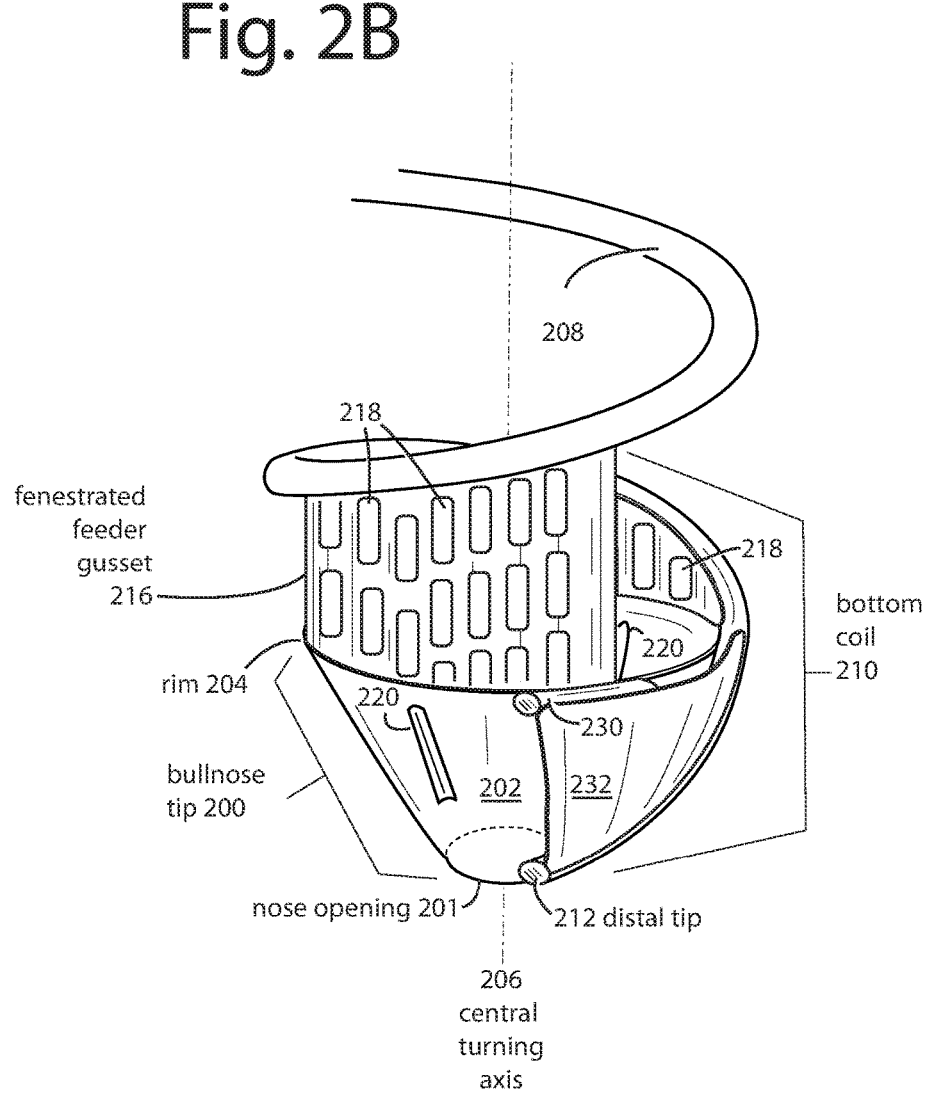

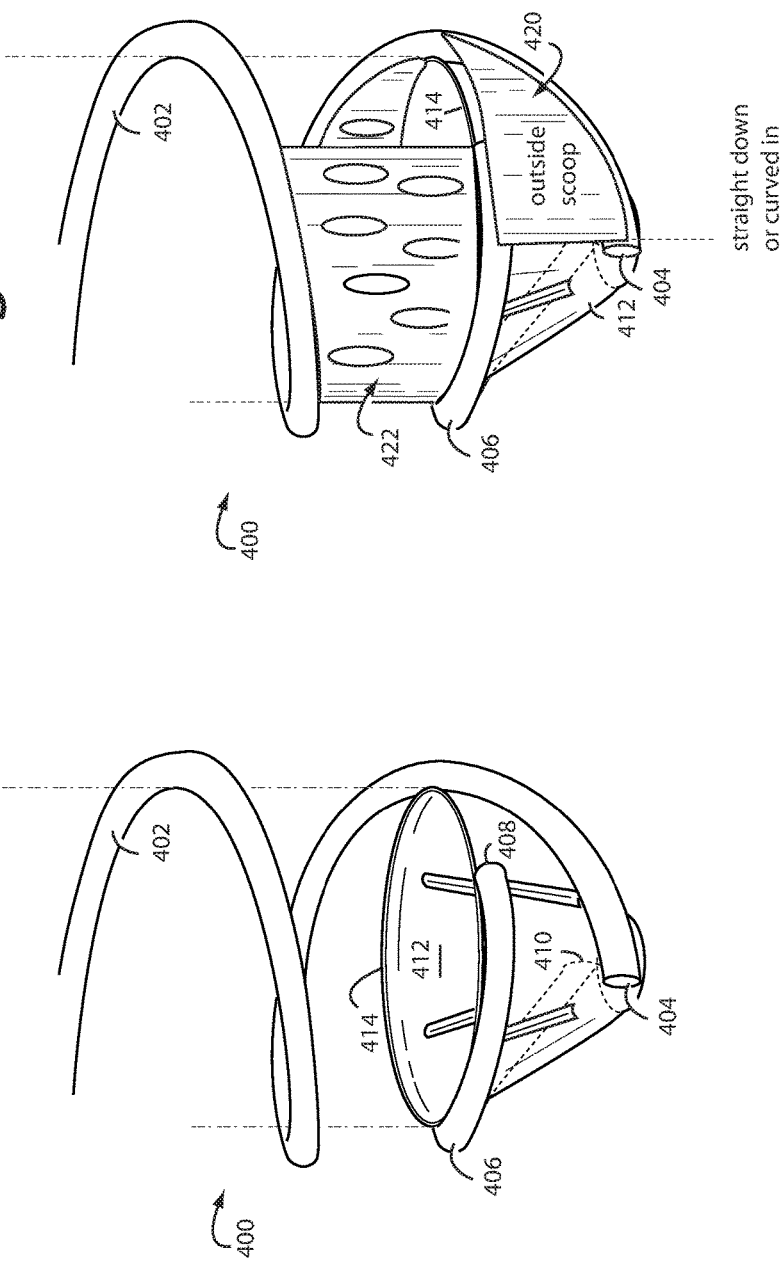

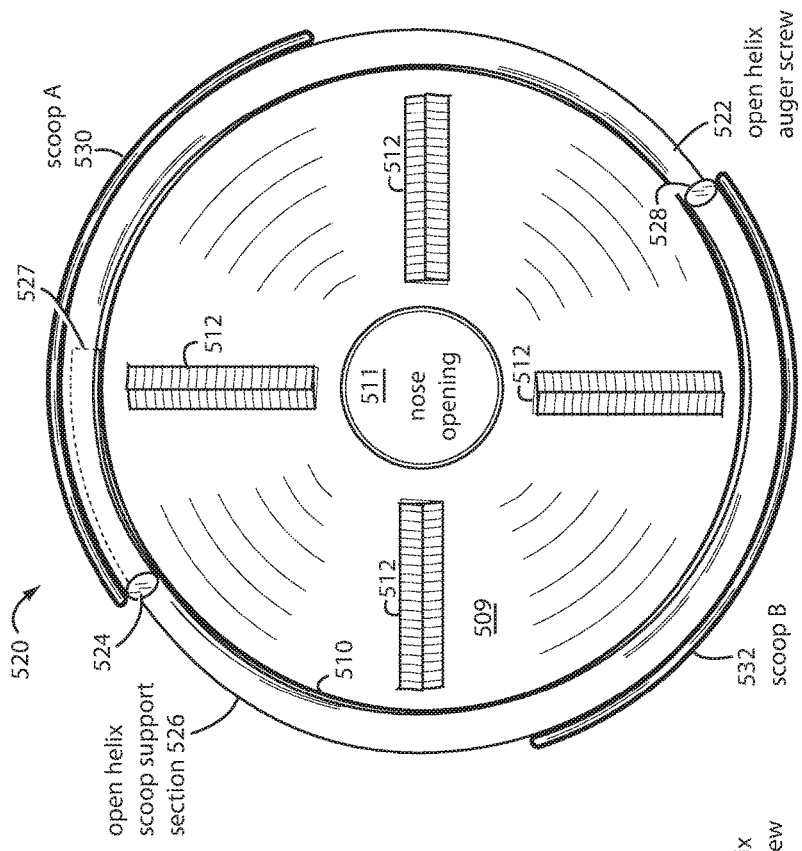
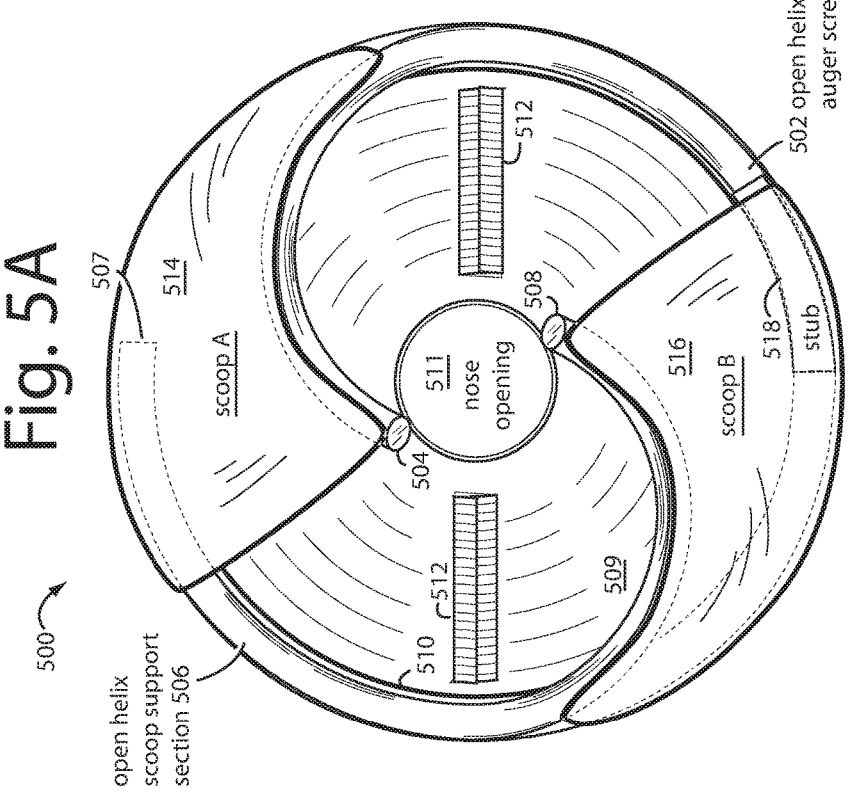

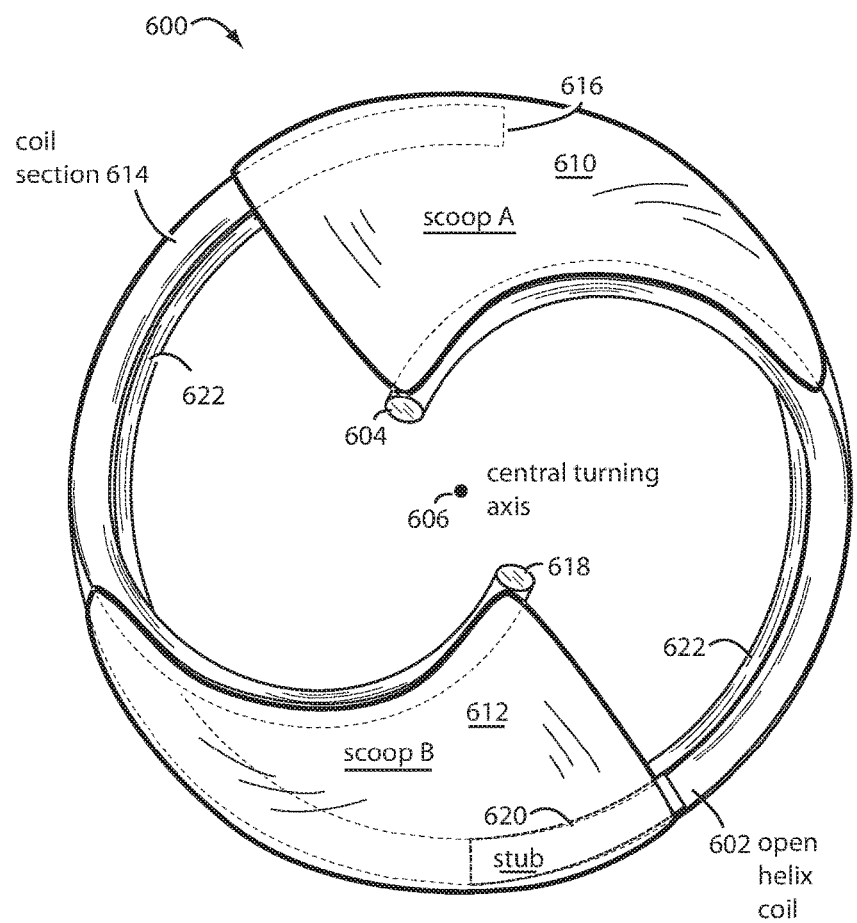

DRY GRANULAR MATERIAL FEEDER/CONVEYOR FOR NEAR-VERTICAL LIFTING

BACKGROUND

1. Field of the Invention

The present invention relates to open-coil flexible, self-feeding dry granular material screw-conveyors that can operate at shallow depths and employ near vertical lifts.

2. Background

Conventional open-coil helix conveyors, spiral conveyors, auger conveyors, and other flexible auger screw conveyors typically rotate a spring steel or stainless-steel open-coil flexible auger screw inside a stationary pipe. The screws are driven by electric motors normally located up top at the discharge end.

Flexible equipment has several advantages over rigid types like auger screw conveyors, bucket elevators, drag chain conveyors, aero mechanical conveyors, and other equipment as they can be used in a variety of environments to transport a range of powder and bulk solid materials.

However, conventional flexible auger screw conveyors all have trouble initially feeding themselves, and then convey the materials less efficiently when oriented near vertically or straight up.

The trouble starts down at the distal end. Material must come in quick enough, and then get accelerated fast enough into a vortex for the centrifugal forces to keep the materials pressed up against the outer walls. Otherwise, the materials will fall back down the center. A simple extension of the open-coil screw beyond the distal end of the conveying pipe becomes a very poor pickup for material when the conveyor must be oriented near-vertical or straight up.

Open coil auger screws offer robust operation in open-core configurations, it eliminates jamming by oversize particles that may have entered the conveying line. The big pieces tend to migrate to the inside surface of the material being transported up. So, instead of jamming between the screw and the pipe-wall, the big pieces generally fall back down the open core.

The gain in robustness, comes at a cost in a reduction in conveying efficiency when vertically oriented, because any materials that should be transported up can also fall back down through the central core and out a tip opening. Centrifugal force is depended upon to keep the material being conveyed pressed to the outer sheath wall, so the conveyors normally operate with a hollow core along their entire length. When open coil conveyors are used in configurations that do not have any bend in their central conveying axis, some commercial open-coil auger screw manufactures suggest placing a stationary pipe in the center to control any potential fallback in the hollow core.

Several manufacturers of "flexible conveyors" describe their applications as needing to start out at inclinations no steeper than a 45-degree incline before gently bending up to any vertical runs.

In actual practice, most applications avoid any bending, because bends will cause the relatively stiff helical coil to rub against the flexible outer pipe wall. The resulting friction takes energy and causes component wear. As a result, most conventional products use only a very gentle bend of the main conveying axis, if they have any bend in the axis at all.

Conventional commercial open-coil helical auger screw conveyor systems have difficulty picking up material when the distal end is near vertical, as a result many of them resort to tilting back from the distal end at a low enough angle to the side to gain sufficient help with the material intake and its packing. Moreover, the intake ends of flexible auger screw conveyor tubes often resort to including a U-shaped channel as a charging adapter. This adapter then connects directly to the bottom if a special inlet hopper at an inclination angle often close to 45-degrees.

Conventional flexible open-coil screw conveyors are almost never connected directly to the outlets of processing equipment, nor are they inserted directly into shipping containers, or storage vessels. Instead, material is sent through bulk bag dischargers, or bag dump stations, or barrel-emptying stations, to dump the material into special inlet feed hoppers for open coil screw conveyors to pick up and convey to upper levels in the plant where it will be used or processed.

There is one instance where near-vertical helical auger screw conveyors will self-feed, that is if their intakes are buried deep enough in granular material. But generally, such will not self-feed. This then is why conventional open-coil helical auger screw conveyors limit inlets to inclinations of about 45-degree, and need a half-pipe channel on the bottom so material can pile on from above before getting centrifugally thrown radially outward into the auger loops.

Auger screws with central shafts also have inlet feed problems, but their issues seem to be quite a bit less severe than the open coil auger screws. No examples of open coil screw conveyors are being sold commercially that can pick up or feed material vertically, or even at steep inclinations.

Commercial flexible conveyors are usually offered in the 2-inch to 4-inch diameter size range. These rotate at several hundred RPM. The so-called G-level from the centrifugal force required inside against the outer walls needs to be on the order of 3-4 G's for them to function reasonably well.

Open coil conveyors will barely function at slower rotation rates that produce centrifugal accelerations which are only two times gravity.

Some suppliers claim to offer a maximum diameter of 8-inches. The outer sheathing is usually a very thick plastic tube that can be bent slightly. Flexing helps with getting into a near vertical orientation to save floor space. But bends result in high wall loads and wear, and provide few benefits.

Large holds in modern cargo ships are used worldwide to store and transport dry granular materials like grains, cement, ores, and plastics. Pouring these materials into the cargo holds is easy enough, but special dry granular material vertical conveyors are needed to extract them. Specialized ship-unloading auger screw conveyors with central shafts and vertically oriented are fed by separately powered, external counter-rotating scoops surrounding the inlet region that force-feed the lifting feeder/conveyor. These ship unloading vertical screw conveyors can get as large as 24-inches in diameter, and can move 2400-tons of bulk material every hour out of the hold of a ship. Siwertell (Cargotel Company, Sweden) is one maker of those big conveyors, and they are in a class by themselves.

In the Siwertell-type vertical auger screw conveyor a separately powered outer pipe surrounds a stationary conveying tube. The outer pipe has scoops at the bottom that feed material into the conveying auger screw. The stationary conveying tube between the rotating central-shaft screw and the outer scoops stops one flight short of the bottom end, and counter rotating scoops bring material into the reach of the rotating central-shaft screw auger/conveyor.

Not so different in construction from the conveyors described here are devices proposed for use in extraterrestrial missions that plow into regolith and pull up grains and powders of the regolith. These require a special plow-head with grater-like scoops and ways to move the materials in reduced gravity environments.

Conventional vertical conveyors to lift dry granular materials generally need some horizontal tilt at their inlet feed ends, or need to be deeply submerged in a granular material, to get the material to fill inside the auger screw and move up to the screw surface. We describe an improvement for feeding conventional central-shaft screw conveyors through the use of an attached nearly conical tip with slots and grater scoops on the surface of the cone in our U.S. Pat. No. 9,334,693, issued May 10, 2016. Its flexible auger screw uses a central driveshaft in the main pipe and both external scoops and internal lifts radially arranged around a plow-head nose shell. In that system, the driving torque for the nearly conical plow-head nose shell is delivered through the central drive-shaft of the screw auger. With the addition of some extra scoops at the top of the conical plow-head tip, extending out to a radius that is greater than the outer radius of the conveying pipe, that configuration can also serve as a drill which has potential applications in micro-gravity drilling and conveying solids on the moon or other extraterrestrial bodies.

SUMMARY OF THE INVENTION

Briefly, improved feeder/conveyor embodiments of the present invention include flexible rotating open helix screws inside cylindrical sheathings. A motor drive is attached to the open helix screw above at a delivery end, and such provides the rotational speeds necessary to generate the centrifugal and lifting forces necessary. The improvements include a curved and tapered support feeder gusset which attaches to the flexible rotating open helix screw, with an attached generally conical bullnose tip as a feeder with multiple grater scoops on its conical surface. The support gusset mechanically supports and aligns the conical bullnose tip to the distal end of the flexible rotating open helix screw and a central turning axis.

A nose opening in the conical bullnose tip allows excess materials inside to be regurgitated and expelled. Such eliminates a source of jamming when oversized materials have entered.

Alternative embodiments of the present invention attach at least one tilted and tapered outer scoop to an inwardly curved extension of the open coil screw. A second outer scoop, if used, is symmetrically located on the opposite side of the tip on a stub extension of coil screw also supported by the support gusset.

The scoops and feeder tips all generate a combination of outward centrifugal acceleration and upward axial motion to positively initiate and feed transfer material into the helical open coil screw for conveying.

These and other objects and advantages of the present invention will no doubt become obvious to those of ordinary skill in the art after having read the following detailed description of the preferred embodiments which are illustrated in the various drawing figures.

IN THE DRAWINGS

Figure 3B:
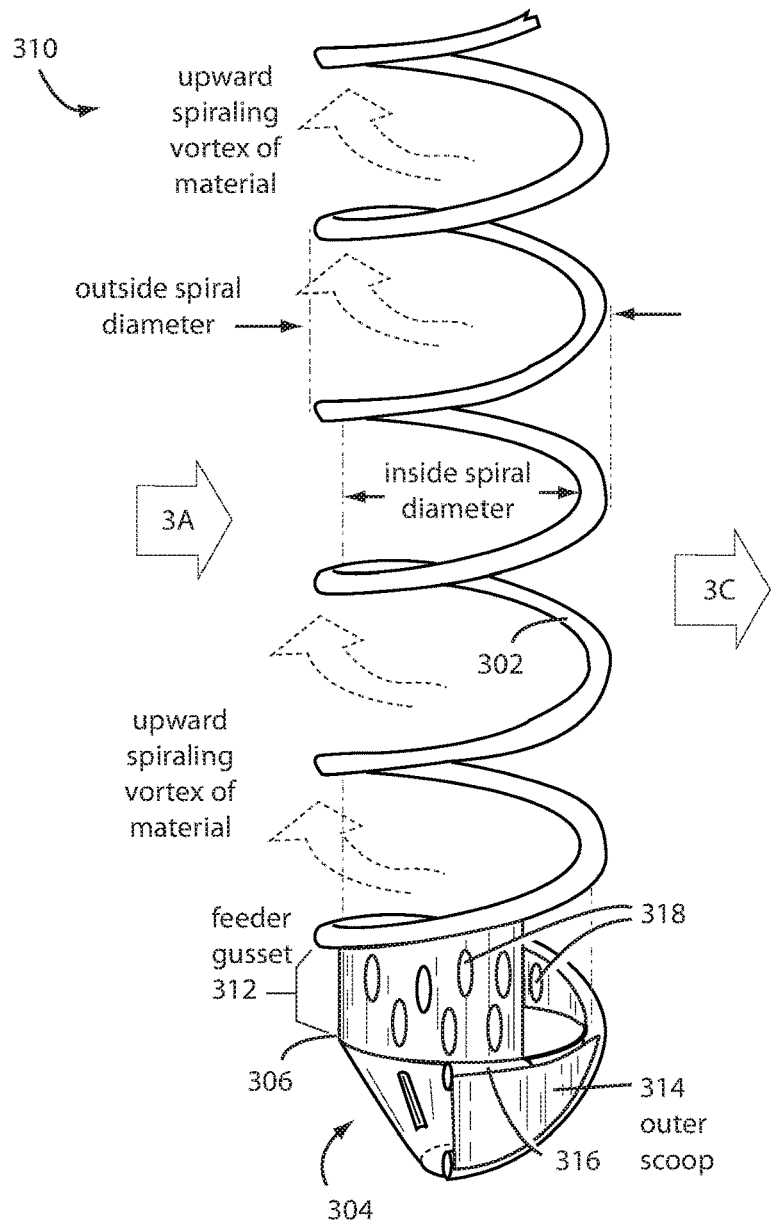
Figure 3C:
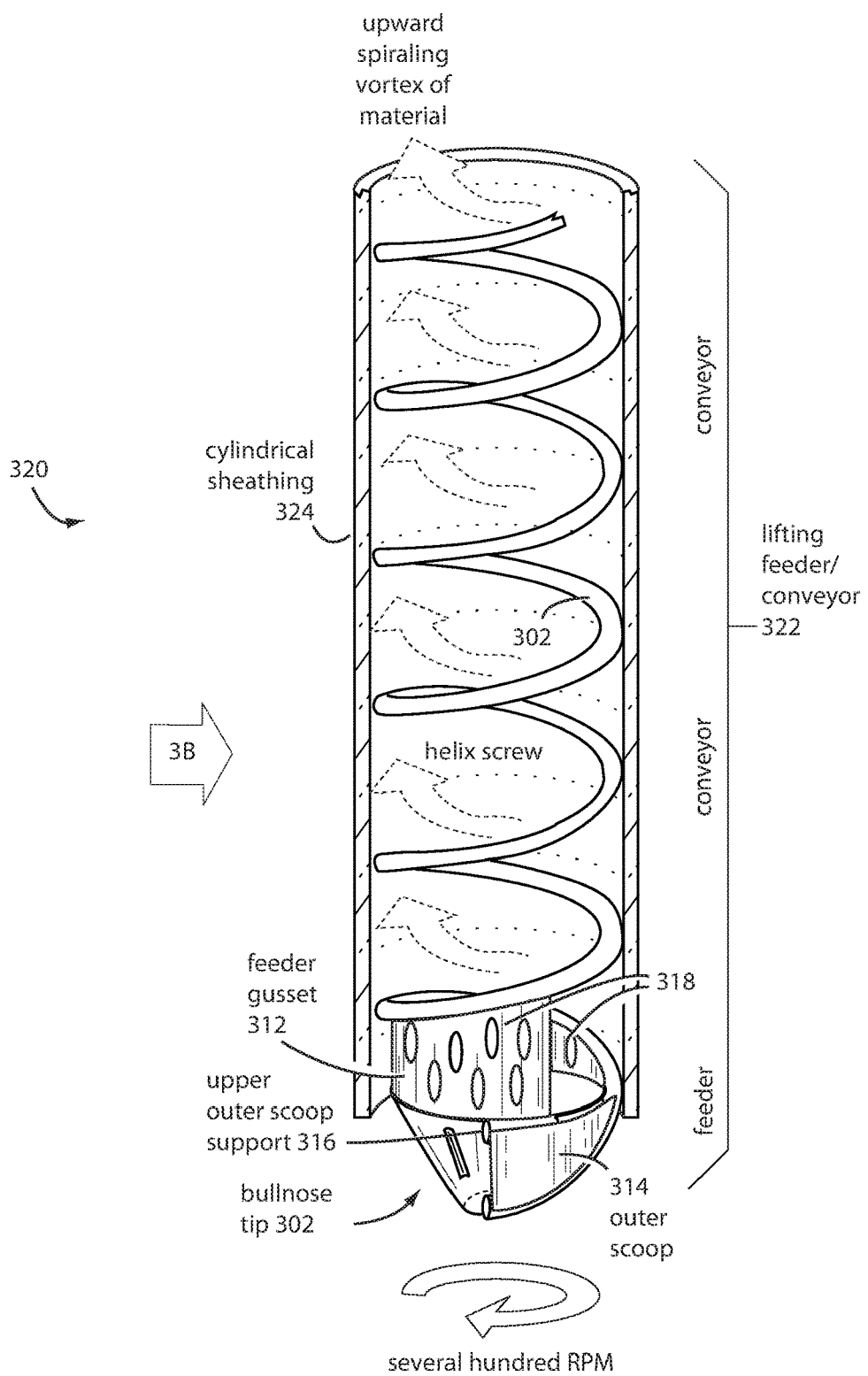
Figure 6B:
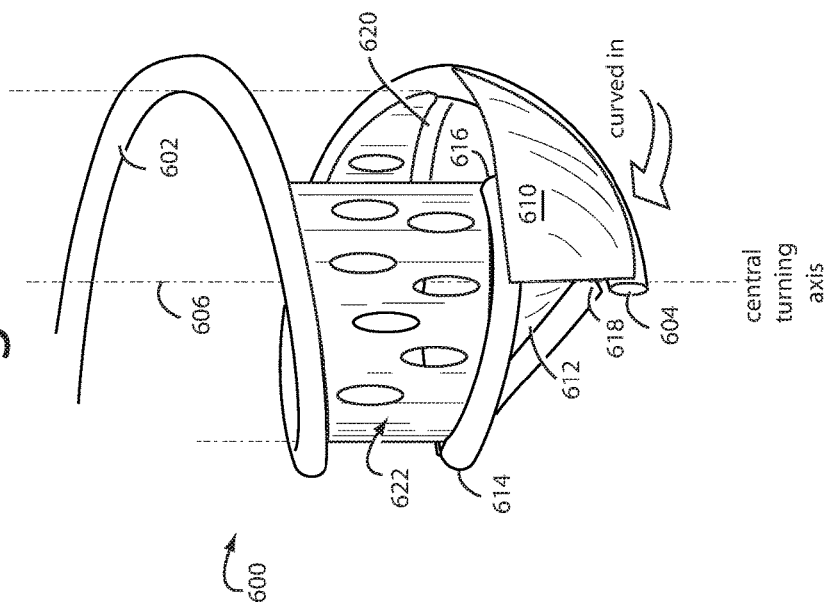
Figure 6A:
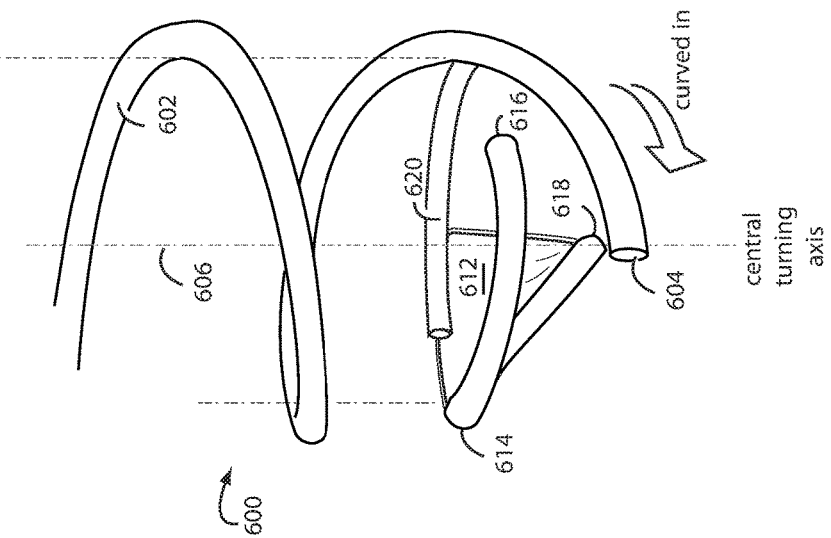

FIG. 1 is a schematic drawing representing the use of a feeder/conveyor embodiment of the present invention that has been inserted from above into a natural deposit or any open-topped storage or shipping container holding dry granular material. Loose materials will self-feed through the grater scoops on the conical surface of the conical bullnose tip, even at shallow depths. The loose material captured will be lifted in a motor-driven swirling vortex at high inclination angles approaching vertical, and without jamming;

FIG. 2A is a perspective side view diagram of a first type of feeder that can be incorporated in the feeder/conveyor embodiment of FIG. 1. Of particular interest is the use of a curved and tapered feeder support gusset that mechanically supports, aligns, and stabilizes a bullnose tip on the bottom coil of an open helix auger screw. A nose opening in the bullnose tip allows excess material to exit the system and thus prevent internal jamming and excessive motor loading;

FIG. 2B is a perspective side view diagram of a second type of feeder that can be incorporated in the feeder/conveyor embodiment of FIG. 1. This too includes the curved and tapered feeder support gusset to mechanically support, align, and stabilize the bullnose tip on the bottom coil of the open helix auger screw. Of particular interest here is the addition of an outside scoop on an extension of the bottom coil of the open helix auger screw that extends beyond the rim of the conical bullnose tip and may extend axially as far as the nose opening of the conical tip. The coil extension may either be continued on its regular cylindrical spiral path, or it may tuck inwardly to hug the bullnose tip down to the nose opening;

FIGS. 3A, 3B, and 3C are an exploded assembly series of perspective view diagrams showing how the essential parts of a lifting feeder/conveyor of FIG. 1 come together for the particular feeder of FIG. 2B;

FIG. 3A reveals how the bottom coil of the open helix auger screw contacts the circular rim and working face of the conical feeder tip with its slots and grater scoops;

FIG. 3B adds the feeder gusset and a single outer scoop;

FIG. 3C then shows the feeder and open helix auger screw installed inside a corresponding cylindrical sheathing such that the feeder and single outer scoop just protrude from the distal end;

FIGS. 4A and 4B are perspective view diagrams showing in an assembly series how a second outside scoop is symmetrically added to that of FIGS. 3A-3C with the help of a coil extension stub support by the feeder gusset and bullnose tip rim;

FIGS. 5A and 5B are perspective end view diagrams of the feeder tip end with a pair of symmetrical outside scoops. FIG. 5A shows a first pair of symmetrical outside scoops inwardly curved and cupped against the bullnose tip. FIG. 5B shows a second pair of symmetrical outside scoops that are straight and parallel to one another;

FIGS. 6A-6B are diagrams of stages one and two in the assembly of a feeder to show better how the components are configured and assembled together; and FIG. 6C is a perspective end view diagram of the completed feeder of FIGS. 6A-6B.

DETAILED DESCRIPTION OF THE PREFERRED EMBODIMENTS

Dry granular material feeder/conveyor embodiments of the present invention are able to scoop up and feed-in dry granular materials inside on their own, and then convey the material up in a vortex to the top and out. FIG. 1 represents such a feeder/conveyor 100 inserted from above into a loose material deposit 102. A symmetrically distributed set of rotating scoops on the face of a conical feeder tip 104 are configured to scour, scrape, collect, and internally accelerate the dry granular materials from where they lay. These deposits 102 range from natural deposits to open-topped shipping containers, or cargo holds in trucks, trains, barges, or ships.

Once brought inside by conical feeder tip 104, a flexible, rapidly rotating open helix screw 106 accelerates and spins up the dry granular materials. Such press out on the inside of a flexible, non-rotating, cylindrical sheathing 108, and are swirled up to the top of the conveyor by a motor 110. The granular material exits from the conveyor through a downward sloping open pipe 112 connected through the side wall of the conveyor sheathing 108.

Typical diameters for feeder/conveyor 100 run 2-4 inches, and the lengths can run 600-1200 inches (50-100 feet). There are sometimes included a slow easy bend in any direction, and with a central turning axis 114 toward or away from vertical 116.

Conventional flexible open-coil screw conveyors can use many types of auger designs, including stainless steel in flat wire, beveled wire, square wire, and round wire. Although we show round wire in our various drawings, the other types can be used as well in our embodiments.

The open-helix auger screw has a constant spiral pitch and consistent outside and inside spiral diameters along its full length. Typical diameters run in the two-inch to four-inch range. The open-helix auger screws are rotated at several hundred revolutions-per-minute (RPM), so as to be fast enough that the centrifugal acceleration levels developed inside on the upward flowing vortex of dry granular materials rise to three to four times terrestrial surface gravitational acceleration, that is three to four G's. Levels less than two G's will barely function, the dry granular materials may fall back down and not vortex enough to stay against the inside walls of the sheathing to be pushed along.

The novel configuration of dry granular material feeder/conveyor 100 allows operation of a central axis 114 at an any angle of inclination including straight up vertical 116. The flexible rotating open helix screw 106 is uniform over its length and has constant inside and outside spiral diameters. Such may be a coiled, heavy metal wire or bar. The conical feeder tip 104 should have an outside circular diameter at a top rim that does not exceed the inside spiral diameter of the flexible rotating open helix screw 106, e.g., so that the two can be more readily attached together and the feeder will not wobble about the central axis 114 during operation.

Feeders can be constructed in at least two principal ways. The two ways illustrated in FIGS. 2A and 2B both include a bullnose conical feeder tip 104 with a symmetrically distributed set of slots and grater scoops. The mechanical support of a feeder on the bottom end loop of flexible rotating open helix screw 106 is challenging because the circular rim of a conical scoop must be attached to more than just a single point of what is essentially a spiraling wire.

A fenestrated support gusset is suggested herein for various embodiments, but other structures like lattices, perforated sheets, and cylindrical fretwork can be used to satisfy both the need for mechanical support and the ability to pass through dry granular materials (to prevent jamming and facilitate conveying).

FIG. 2A represents a first type of feeder with a conical bullnose tip attached to the distal end of the open helix auger screw. In both FIGS. 2A and 2B, a bullnose tip 200 includes a nose opening 201, a conical working face 202 and a circular rim 204 that are all coaxially disposed about a central turning axis 206. The circular rim 204 is in a plane normal to the central turning axis 206. The outside diameter of circular rim 204 matches the inside spiral diameter of a flexible rotating open helix screw 208 in order to facilitate their mutual alignment on central turning axis 206.

The bullnose tip 200 is fixed such that it will protrude from the distal end of the cylindrical sheathing 108 (FIG. 1) in order for it to be able to bite into material 102 to be conveyed.

The flexible rotating open helix screw 208 is coaxially disposed on the central turning axis 206 and inside a cylindrical sheathing 108 (FIG. 1) such that it is free to turn. But the outside spiral diameter of flexible rotating open helix screw 208 also needs to be large enough to keep a fast flow of dry granular materials spinning out and spiraling up against the inside walls of sheathing 108.

The central turning axis of the conveyor 206 may be gradually curved along its length.

A bottom loop or coil 210 terminates at a tip 212 of its distal end at a rim point 214 on the circular rim 204 of the bullnose tip 200. Mechanical terminations like this can include a metal-to-metal brazing or welds.

A fenestrated support gusset 216 is essentially a cylindrically curved and tapered piece of sheet metal with a top edge that follows and is welded to the inside spiral of bottom coil 210. A square bottom edge butt welds to less than a full 360-degree turn of rim 204. The bullnose tip is thus aligned, stabilized and mechanically supported by the fenestrated support gusset 216. The fenestrated support gusset 216 further includes large perforations, holes, and/or gaps 218 through which dry granular materials may pass during operation.

A number of symmetrically distributed grater scoops and inlet slots 220 are disposed in the conical working face 202, and each are equally sized and arranged to break loose and force-in the dry granular materials.

FIG. 2B essentially adds a single large external scoop to that shown in FIG. 2A. The open helix screw 208 is extended down such that the distal tip 212 of bottom coil 210 curves in and reaches all the way down to the nose opening 201. A short coil section 230 or other filler is welded between rim 204 and the top of a leading edge of an outside scoop 232. A large open vertical mouth is formed between working face 202 and the leading edge of outside scoop 232. A gap is left at the top above bottom coil 210 so that dry granular material may pass through. The bottom edge of the outside scoop 232 is welded to a corresponding part of the outside edges of bottom coil 210. While not illustrated in FIG. 2, a second large external scoop exactly duplicating the extension of the helix shown in FIG. 2B could be included on the opposite side, e.g., located 180-degrees around the rim from the extension shown. The second free-hanging external scoop, if included, would be attached to the rim of the bullnose tip at the rim and to one or more short sections of a circular support ring 230 attached between the bullnose tip rim and the external scoop.

In general, open coil screws are quite a bit less efficient at conveying loose materials than a "normal" screw augers with a central shaft. But all the flexible screws being offered that allow a gentle bend in the outer sheath, and that force the rotating auger to bend as well, use an open coil configuration. It's seemingly not practical to flex with a solid central shaft opposing the flexing.

We tested a "normal" screw auger with a flexible shaft based on a type of flexible driveline as is used in common weed-whackers. It functioned reasonably well overall, but the conveying efficiency decreased as the inclination angle and lift were increased. The implication is that a curved conveyor that starts near horizontal and then bends up to near vertical can suck in more than it can spew out. The material packing along the line that occurs increases to load on the conveyor and its motor. Eventually the motor will overload and trip off.

One fix or cure would be to place an input restrictor at the tip. Or an active feedback loop could be combined with an inlet feed control that reduces the inlet feed rate whenever the motor torque demands exceeded some predetermined limiting value.

Open coil conveyors are inherently limiting in the volume of material that they can convey, and that will automatically help avoid line jamming. If too much material starts to over fill the conveying line as it pushes into the middle region, the excess squeezes in off the coils and will fall back down inside the open loops. Some companies that sell such things now indicate that they are very robust in their ranges of operation. But such robustness comes at the expense of efficiency.

Conventional open coil screw conveyors cannot "self-feed" in a vertical orientation. If deeply buried they pick up some material using only the coil loops themselves as a feed mechanism, but generally utilizing a simple extension of the open coil beyond the end of the outer conveying tube results in very low feeding efficiency. Most conventional open coil conveyors are tilted at angles like 45-degrees and open the top half of the sheathing for one or two full flights of the coil to allow materials to spill in. But these rotating coils have the bed weight above pressing down and the half-sheath on the bottom that form an efficient feeding region.

A bullnose scoop coupled with an inner sheathing is estimated by us to be able to scoop up material vertically and then lift it effectively with open-coil screws. We have not built or tested one of these yet, but instead describe here our best thoughts here on how to succeed.

In one upcoming experiment we plan to conduct, we will obtain an open coil screw conveyor from one of the major manufacturers and custom fit one of our feeder tips on it. If we see that there are significant benefits to this combination, we will document the construction and operation more fully in our later patent filings.

It is important to understand that the blunted nose of the conical bullnose tip is open, e.g., nose opening 201. This is important to have in open-coil screw conveyors because heavy oversize particles that enter the system can freely exit the system, making its operation more robust because jamming situations can be self-corrected. Materials will therefore move freely in or out of the conveying system through nose opening 201.

FIG. 3A shows a first assembly step 300 in which an open helix auger screw 302 has a last bottom quarter turn attached outside a conical scoop and feeder 304. The open helix auger screw 302 has a constant spiral pitch for its full length, a length that can reach one hundred feet. It is also important that the open helix auger screw 302 have both a consistent inner spiral diameter and a consistent outer spiral diameter. A typical outside spiral diameter is 2-4 inches. The conical scoop and feeder 304 has a circular top rim with a diameter that just fits inside the inner spiral diameter of the open helix auger screw 302. This is key to achieving a coaxial alignment between the two.

In operation, a motor turns open helix auger screw 302 at several hundred RPM, and conical scoop and feeder 304 turns with it. This rotational speed is so high that dry granular material feeding inside will be flung upwards and outwards into the spinning coils of the open helix auger screw 302. This creates an upward spiral vortex of material that generates a centrifugal force on the material granules that holds them together and presses them inside a containing sheathing wall (324 in FIG. 3C).

FIG. 3B shows a second assembly step 310 in which a feeder gusset 312 is welded at its top edge to an inside edge of a bottom loop of the open helix auger screw 302. A bottom edge of the feeder gusset 312 is welded to a corresponding part of the circular rim 306. The joint is normal to a central turning axis.

Step 310 is complete at this point when using the feeder of FIG. 2A. Otherwise, the feeder of FIG. 2B adds an outer scoop 314. It is welded at its bottom edge along the outside edge of the last quarter turn of open helix auger screw 302. The top leading corner of the outer scoop 314 is welded to a coil section 316 and a corresponding part of circular rim 306. Inside outer scoop 314, dry granular material is pushed up, and then over the top of the outer scoop while still riding on the open helix auger screw 320. Inside the cylindrical sheathing (FIG. 3C), and above the scoop, the material inside that is picked up exits from the top edge of the outer scoop 314. Because it's inside the sheathing 324, it will then get conveyed up inside the sheathing as open-coil helical screw 302 rotates.

Dry granular material has multiple ways to flow in and out through feeder gusset 312 via a number of large fenestrations 318.

FIG. 3C shows a third assembly step 320 for feeder/conveyor 322. The assembly of FIG. 3B is placed inside a corresponding length of cylindrical sheathing 324. Together, they preferably exhibit a slight ability to flex, e.g., over a hundred foot length from a 45-degree inclination at the distal feeder end bending gradually up to a near vertical orientation at the top discharge end. Alternatively, the assembly can be used with a perfectly straight central axis oriented at any inclination, even straight up.

During operation, the loose dry granular materials scooped up inside by the conical bullnose tip are spun up and flung out radially and upwards against the inner walls of cylindrical gusset 312, through the openings 318 in the cylindrical gusset 312 or over the top of the gusset 312 to the inner wall of cylindrical sheathing 324. The material brought inside the conical bullnose tip 306 is one feed-stream of material for the helical screw. Another feed-stream is the material moving in through the outer scoop 314. The material moving past the conical bullnose tip and into the helical screw conveying region slides up support gusset 312. Even with some circumferential slip, it passes through openings 318 in cylindrical gusset 312. Helical screw 302 will then pick up material from both feed-streams of material as it rotates inside outer sheathing 324. The spin applied to open helix auger screw 302 whips the materials up into a spinning vortex. This is what pushes the material up and to exit at the top through an outlet tube.

FIGS. 4A and 4B show in an assembly series how a second outside scoop can be symmetrically added to that of FIGS. 3A-3C. A feeder 400 is attached at the distal end of an open helix coil 402 and terminates at a coil tip 404. A coil extension 406 is welded on the opposite side, beginning at a starting end 408, along a rim 414 of feeder tip 412, and continuing down to a terminating end 410. A gap forms between starting end 408 and open helix coil 402 that allows material to flow through during operation.

While not obvious from the drawing of FIGS. 4A and 4B, such coil tip 404 can be tucked up tight against the nose opening (as in FIG. 5A), or it can be continued straight (as in FIG. 5B). This leads to two different types of outer scoops as best compared in FIGS. 5A and 5B.

A first outside scoop 420 is supported along its bottom edge by the last quarter turn of open helix coil 402. A second outside scoop (not seen here) is supported along its bottom edge with the coil extension 406 on the opposite side. The coil extension 406 itself is supported by welding it to a feeder gusset 422 and bullnose tip rim 414.

FIGS. 5A and 5B represent two different ways a symmetrical pair of outer scoops can be configured, e.g., curved in and cupped as in feeder 500 of FIG. 5A, or straight as in feeder 520. Both feeders use a conical bullnose tip 509 with a rim 510, a nose opening 511, and a number of symmetrically distributed graters 512.

Feeder 500 in FIG. 5A mounts on a distal end of an open helix auger screw 502 that curves in for a quarter turn and terminates at an end 504 close to nose opening 511. For scoop symmetry, an open helix scoop support section 506 is positioned on the opposite side running along rim 510 from a starting end 507 for a quarter turn and then curving in for a quarter turn and terminating at an end 508 close to nose opening 511 as did the first. A cupped and curved first scoop 514 is welded along its bottom inside edge to the last quarter turn of open helix auger screw 502. An identical cupped and curved second scoop 516 is welded along its bottom inside edge to the last quarter turn of open helix scoop support section 506. A stub 518 and a similar part of open helix scoop support section 506 each respectively provide a mounting spot to weld the top inside edge of their corresponding scoops 516 and 514.

Feeder 520 in FIG. 5B mounts on a distal end of an open helix auger screw 522 that carries on straight away from nose opening 511 and terminates at an end 524. For scoop symmetry, an open helix scoop support section 526 is positioned on the opposite side running along rim 510 from a starting end 527 for a quarter turn and then spiraling down a quarter turn and terminating at an end 528 away from nose opening 511 as did the first. A cylindrically curved first scoop 530 is welded along its bottom inside edge to the last quarter turn of open helix auger screw 522. An identical cylindrically curved second scoop 532 is welded along its bottom inside edge to the last quarter turn of open helix scoop support section 526.

Although as yet untested, two symmetrically disposed outer scoops like 514 and 516 in FIG. 5A may work sufficiently well to make bullnose tip 509 and graters 512 entirely redundant. These outer scoops attached as they are to a converging double helix can operate like acceleration ramps. The spiral extension of the conveying helix each end up forming upward sloping curved surfaces, very similar in tilt and shape to partial sections of a conical or funnel-like surface.

Those two tilted and curved scoops could serve the entire function of conical bullnose tip 200 (FIG. 2A-2B), including the function of the graters and inlet slots 220. A practical alternative embodiment of the present invention thus includes two curved and inwardly tilted outer scoops connected to a fenestrated support gusset (e.g., 216, FIGS. 2A-2B) and two sections of a circular support ring attached to the bottom rim of the fenestrated support gusset.

In FIGS. 6A-6C, the bullnose tip and graters described above are eliminated altogether in an alternative embodiment of a feeder/conveyor like that in FIG. 1. FIG. 6A represents a first stage of assembly so that the several components can be illustrated and understood here. FIG. 6B represents the next stage of assembly which adds a gusset and a scoop that otherwise obscure (in this illustration) the construction and orientation of the outer scoop on the backside.

A complete feeder 600 is disposed on the last turn of a distal end of an open helix coil 602. Such terminates at an end 604 which is tucked inwards for its last quarter turn in toward a center turning axis 606. This last quarter turn provides a solid mounting for a first outer scoop 610, at least its bottom edge anyway.

A second outer scoop 612 also needs a solid mounting along its bottom edge that will position it symmetrically opposite to first outer scoop 610. Scoops 610 and 612 are identical and interchangeable, and positioned in balance to one another. Mounting the second outer scoop 612 is difficult to do with nothing more than open helix coil 602 available for mechanical support. So an orphan or floating section of coil 614 is needed. It has a starting end 616 and runs in its first half in a plane normal to the central turning axis 606 for a quarter turn. The last half of the section of coil 614 dives down and curves inward to a matching end 618. Such matches the curve and inward dive of open helix coil 602 in its last quarter turn that terminates at end 604.

The first part of the section of coil 614 near end 616 is used on its outside edge to support the top leading half of the first outer scoop 610. The top leading half of the second outer scoop 612 is similarly supported by a coil stub 620. The outside edge of coil stub 620 is welded to the top leading half of the second outer scoop 612. The inside edge of coil stub 620 is welded to a bottom edge of feeder gusset 622. The whole quarter-turn length of the section of coil 614 in the plane normal to the central turning axis 606 is welded on its inside edge to a corresponding bottom edge of feeder gusset 622.

Feeder gusset 622 is a section of a thin wall cylindrical pipe that fits snugly inside the inside spiral diameter of open helix coil 602. Stainless or spring steel would be an obvious choice of material because that's what typical open helix coils 602 are generally made of and welding thus would be simplified. Feeder gusset 622 is shown in FIG. 6B as being less that 360-degrees, and such could be in two matching parts to lessen interference with material being brought in during operation by scoops 610 and 612.

The open helix coil 602 has along its full length a constant pitch and uniform inside and outside spiral diameters. It is important that the first half of the section of coil 614 share those same inside and outside diameters, e.g., for a quarter of a turn. Such is necessary to fit a cylindrical gusset 622 on corresponding inside edges Referring back to FIG. 1, if deposited materials 102 are not quite loose enough to flood-in on their own, the bottom collection end of feeder/conveyor 100 can be swept around by angling from a single point above. Otherwise, the whole can be moved to traverse side to side and front and back of a cargo hold or other deposit.

Embodiments of the present invention are not intended to be used like drills, nor do they function like drills. It is difficult to "drill" into stiff deposits that do not yield easily to the forward advancements of the shoulders of the outer sheath pipe. And so these embodiments here are best functionally described as dry granular material feeder/conveyors. Their best use is to bring up loose material from below, conveying it at steep inclines, including straight up.

In general, dry granular material feeder/conveyor embodiments of the present invention can provide for near-vertical lifting. The feeder tips described here can be used on rigid or flexible conveying lines. Flexible conveying is mentioned often in this description because almost all current flexible screw conveyors utilize open coil screws, and the feeder tip described here is specifically intended for use on open coil screw conveying systems.

A flexible construction and use of flexible materials in the cylindrical sheathing would allow the conveying system to tolerate being bent and flexed. A motor drive connected to a top end of the flexible rotating open helix screw provides a rotational force inside the cylindrical sheathing and through the flexible rotating open helix screw down to the bullnose tip, conical working face, graters, and inlet slots. An outside scoop attached to the bottom end of the flexible rotating open helix screw and bullnose rotating scoop and that functions as an auxiliary scoop. A second outside scoop may be symmetrically attached to the bottom end of the flexible rotating open helix screw and bullnose rotating scoop to functions as another auxiliary scoop. Such can balance out a non-symmetry that would otherwise exist in the grating action of the whole.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A dry granular material feeder/conveyor for near-vertical lifting from shallow dry material depths, comprising:
    a flexible screw conveyor including a length of cylindrical tube sheathing inside of which is disposed a similar length of an open helix screw auger connected to be rotated within at a top end by a motor;
    a feeder with a top circular rim attached to a bottom end of the open helix screw auger and positioned protrude at a bottom end of the cylindrical tube sheathing; and
    a feeder support gusset cylindrically curved laterally and attached outside along its top edge to less than a full turn of an inside edge of the open helix screw auger, and further attached along its bottom edge to the top circular rim of the feeder to support, stabilize, and coaxially align the feeder; and
    wherein, the feeder is configured such that when it is turned to input dry granular material from shallow emersion depths by the motor turning the open helix screw auger, any dry granular material that is input will be radially and spirally flung outward and upward onto the open helix screw auger;
    wherein, the motor has sufficient turning speed capability and the feeder configuration are such that dry granular material flung onto the open helix screw auger is subjected to a centrifugal force as it is pushed to spiral up in a vortex inside the cylindrical tube sheathing walls sufficient to stay on the open helix screw auger for its conveyance up to a discharge tube.

2. The dry granular material feeder/conveyor of claim 1, further comprises in the feeder:
    a conical bullnose tip with a number of symmetrically distributed graters, slots and scoops, a nose opening, and having a top circular rim about equal in diameter to the bottom edge of the feeder support gusset, and attached to it for support, stabilization, and alignment with a central turning axis.

3. The dry granular material feeder/conveyor of claim 1, further comprises in the feeder:
    a first outer scoop attached along the inside of its bottom edge to the outside edge of a last quarter turn of the open helix screw auger, and attached along a portion of its inside top edge to a coil section or stub attached along a portion of the bottom edge of the feeder support gusset.

4. The dry granular material feeder/conveyor of claim 1, further comprises in the feeder:
    a first outer scoop attached along the inside of its bottom edge to the outside edge of a last quarter turn of the open helix screw auger, and attached along a portion of its inside top edge to a coil section or stub attached along a portion of the bottom edge of the feeder support gusset; and
    a second outer scoop, identical to the first, and attached along the inside of its bottom edge to the outside edge of a last quarter turn of an add-on open helix screw section, and attached along a portion of its inside top edge to a coil section or stub attached along another portion of the bottom edge of the feeder support gusset.

5. The dry granular material feeder/conveyor of claim 1, further comprises in the feeder:
    a first cupped and inwardly curved outer scoop attached along the inside of its bottom edge to the outside edge of a last inwardly curved quarter turn of the open helix screw auger, and attached along a portion of its inside top edge to a coil section or stub attached along a portion of the bottom edge of the feeder support gusset; and
    a second cupped and inwardly curved outer scoop, identical to the first, and attached along the inside of its bottom edge to the outside edge of a last inwardly curved quarter turn of an add-on open helix screw section, and attached along a portion of its inside top edge to a coil section or stub attached along another portion of the bottom edge of the feeder support gusset;
    wherein the outer scoops are set to symmetrically converge toward a center turning axis.

6. The dry granular material feeder/conveyor of claim 1, further comprises in the feeder:
    a conical bullnose tip with a number of symmetrically distributed graters, slots and scoops, a nose opening, and having a top circular rim about equal in diameter to the bottom edge of the feeder support gusset, and attached to it for support, stabilization, and alignment with a central turning axis;
    a first cupped and inwardly curved outer scoop attached along the inside of its bottom edge to the outside edge of a last inwardly curved quarter turn of the open helix screw auger, and attached along a portion of its inside top edge to a coil section or stub attached along a portion of the bottom edge of the feeder support gusset; and
    a second cupped and inwardly curved outer scoop, identical to the first, and attached along the inside of its bottom edge to the outside edge of a last inwardly curved quarter turn of an add-on open helix screw section, and attached along a portion of its inside top edge to a coil section or stub attached along another portion of the bottom edge of the feeder support gusset;
    wherein the outer scoops symmetrically converge toward the center turning axis proximate to the nose opening.

7. The dry granular material feeder/conveyor of claim 1, further comprises:
    a number of fenestrations comprising perforations, holes, and/or gaps all disposed in the feeder support gusset through which dry granular materials may flow in and out during operation.

8. The dry granular material feeder/conveyor of claim 1, wherein:

the open helix auger screw has a constant spiral pitch and consistent outside and inside spiral diameters along its full length; and the motor motor attached to turn the open helix auger screw is capable of rotating it inside the cylindrical tube sheathing at least as fast as several hundred revolutions-per-minute (RPM) such that any centrifugal acceleration levels developed on dry granular materials in an upward flowing vortex will attain a magnitude of 3-4 times terrestrial surface gravitational acceleration G.

* * * * *